United States Patent [19]

Hotta et al.

[11] Patent Number: 4,752,086
[45] Date of Patent: Jun. 21, 1988

[54] AUTOMOBILES

[75] Inventors: Yohji Hotta, Kawasaki; Naomichi Sasa, Fujisawa, both of Japan

[73] Assignee: Isuzu Motors Limited, Tokyo, Japan

[21] Appl. No.: 907,901

[22] Filed: Sep. 15, 1986

Related U.S. Application Data

[62] Division of Ser. No. 706,062, Feb. 27, 1985, abandoned.

[30] Foreign Application Priority Data

Feb. 29, 1984 [JP] Japan ................... 59-036198

[51] Int. Cl.⁴ ............................................. B62D 21/07
[52] U.S. Cl. ................................... 280/792; 280/699
[58] Field of Search ................ 280/699, 792, 700, 701

[56] References Cited

U.S. PATENT DOCUMENTS

| | | | |
|---|---|---|---|
| 1,361,047 | 12/1920 | Gregory et al. | 280/699 X |
| 1,565,624 | 12/1925 | Chilton | 280/785 X |
| 2,012,202 | 8/1935 | Pavlack, Jr. | 280/699 X |
| 2,058,580 | 10/1936 | Evans | 280/792 X |
| 2,110,819 | 3/1938 | Poirier | 280/699 X |
| 2,122,308 | 6/1938 | Banks | 280/701 X |
| 2,485,500 | 10/1949 | Lyman | 280/792 |
| 2,551,528 | 5/1951 | Darrin | 280/792 X |
| 2,756,835 | 7/1956 | Müller | 280/792 X |
| 3,135,347 | 6/1964 | Vranysovics | 280/792 X |
| 3,499,661 | 3/1970 | Rowe, Jr. | 280/792 X |
| 3,614,124 | 10/1971 | Schwabenlender | 280/792 X |
| 3,791,472 | 2/1974 | Tatsumi | 280/792 X |

FOREIGN PATENT DOCUMENTS

| | | | |
|---|---|---|---|
| 690478 | 4/1940 | Fed. Rep. of Germany | 280/700 |
| 2930036 | 2/1981 | Fed. Rep. of Germany | 280/781 |
| 327706 | 7/1935 | Italy | 280/781 |
| 122621 | 8/1948 | Sweden | 280/699 |

Primary Examiner—John J. Love
Assistant Examiner—Charles R. Watts
Attorney, Agent, or Firm—Cullen, Sloman, Cantor, Grauer, Scott & Rutherford

[57] ABSTRACT

The present invention relates to automobiles, each featuring a low floor realized by introducing the frame which is fabricated with the inter-member gap of the frame members narrowed in the vicinity of the rear driving axle system, and assembled approximately flat over the range extending from the front to the rear of the rear driving axle system, allowing the above-ground level to be lowered as much as possible with the frame being assured freedom from interference by the rear driving axle system.

7 Claims, 15 Drawing Sheets

AUTOMOBILES

This is a divisional application of Ser. No. 706,062, filed 2/27/85, now abandoned.

BACKGROUND OF THE INVENTION

1. Field of the Invention

The present invention relates to automobiles, particularly to those of a rear wheel drive type (hereinafter referred to as a RWD system) which employed a floor fabricated to be low and lengthwise flat on which to mount a baggage room, a deck body, etc. for receiving cargo.

2. Description of the Prior Art

Generally with trucks and similar motor vehicles for cargo transport and delivery service, it is desired that the floor on which cargo is loaded be flat, wide and as low as practical in reference to the ground level.

A low floor renders driver ease of cargo loading and unloading and therefore serves to improve not only the workability of trucks or the like but also the efficiency of cargo loading and unloading.

A flat floor with no structural protrusion in the area between the wheel rooms (arch-profiled portions for rear wheels) allows smooth cargo arrangements thereon and effective utilization of the floor space in the luggage room. Further, securing a wide floor space within the range in which the floor undergoes dimensional restriction due to the length of a car body, particularly the width thereof, makes it feasible to effect one cycle of loading with many cargoes, and improve the efficiency of transport.

Reflecting the reality that the ratio of aged motor drivers has been rising in recent years with the number of female drivers likewise increasing, it may fairly be said that low-floor structural engineering will meet mounting demands to better cargo loading and unloading onto and from a deck body, particularly for such drivers in charge of via-truck or commercial vehicle delivery service.

With motor vehicle (a) such as a small truck, for example, having a high deck body as shown in FIG. 1, floor (b) comes in a flat structure. The motor driver in charge of such a motor vehicle is required to hold each cargo (c) up to the deck floor level during loading. Loading with said motor vehicle entails intensive fatigue to the driver. Where no assistant is available, the driver must effect loading in two steps; in the first step, some cargoes (c) are placed on the deck floor, and the second step then comes with his jumping up thereon for cargo arrangement. Such cargo loading is really hard work.

The motor vehicle with its deck floor lowered to approximately the waist height of a driver by decreasing the radius of rear wheel (f) as shown in FIG. 2 allows ease of loading, compared with the high deck body type referred to above. However, with said motor vehicle, the driver is not allowed to ascend floor (b) with the cargo in his arm. He is required to separately effect loading and arrangement on floor (b) with no improvement of efficiency.

Lowering the deck floor to the level shown in FIG. 3 at which a driver can ascend the deck in one step will not only remarkably relieve the driver of fatigue but also will improve the workability of a motor vehicle and the efficiency of loading. With a lowered deck body, the driver is allowed to effect cargo loading and subsequent cargo arrangement on floor (b) simultaneously, following his raising of the cargo up to a reduced deck floor level. Thus, with a low-deck body type motor vehicle, one man can easily undertake the job of loading.

To date, the motor vehicles used for cargo transport service are usually provided with a front engine, RWD system and a rear engine. The RWD system keeps driving rear axle shafts under the luggage room or the deck body at the rear part of a vehicle.

Designed to propel a vehicle by driving the rear wheels, the system is suited for use with those motor employed for heavy cargo transport. Taking into account severe conditions of heavy cargo transport and the cost of automobile production, the RWD system for commercial vehicles is generally of a rigid type (axle suspension type) featuring robust axles and inexpensiveness.

As shown in FIG. 4, the RWD type of the rigid type comprises rear axle case (R) including widthwise centered enlarged round structural member (d) which houses the differential gears (hereinafter referred to as the differential) and tubular members (e) (hollow members), each extending monolithically from the widthwise centered round structural member (d) in the widthwise direction, rear axle shafts (not shown in the figure)—rear driving axle shafts—, each being inserted into and running through the interior of tubular member (e) of rear axle case (R) with one end engaging with the differenrtial side gear and the other end coupled to rear wheel (f), and so forth, both rear axles moving up and down, together with the rear axle case (R), following vertical movements of both rear wheels (f). Further, each suspension mechanism (h) (a rigid axle type suspension system) comprising a leaf spring, joined to side member (g)—a component making up the frame—, and other attachments are secured to each tubular member (e) holding said rigid rear axle therein, whereby the loads respectively of body (i), cargo, etc. which are applied to the leaf spring, are suspended. Side member (g) is a rigid structural member making up the frame, each frame comprising a pair of said side members extending lengthwise from the front to the rear of a vehicle and which are kept apart with a wide space maintained widthwise between the two. Particularly, in the vicinity of each rear axle, each of said side members (g) is located above end portions (j) of tubular member (e) of rear axle case (R). Floor (k) is laid over a pair of side members (g). The motor vehicles, each using the RWD system with the conventional rigid type rear axles possessed the various restrictions enumerated below, resulting in the increase in above-ground height (H) of floor (k), particularly in the level of rear axle case (R).

(1) With the RWD system, rear axle case (R) of a monolithic construction moves up and down, following vertical movements of rear wheels (f). Therefore, to prevent a collision between floor (k) on side of the body (l) upheld with suspension mechanism (h) and widthwise centered round portion (d) so molded at the center of rear axle case (R), clearance (C1) is required.

(2) Relative vertical movements of left and right rear wheels (f) cause rear axle case (R) to move up and down with one rear wheel (f) acting as a fulcrum upon its coming back into contact with the ground earlier than the other rear wheel. With this taken into account, it is necessary that side member (g) located above each of both widthwise end portions (j) of tubular member (e) have a height to allow rear axle case (R) sufficient to move up and down within a given amplitude but to prevent collision with tubular member (e).

(3) To limit the oscillation amplitude of tubular member (e) referred to in (2) above, buffer rubber (1) is provided underneath of side member (g), facing the tubular member (e). The buffer rubber (1) must be mounted with specified clearance (C2) provided over the surface of the tubular member (e) so that the buffer member (1) will not only allow the tubular member (e) to move up and down within a given amplitude but also to restrict vertical movements thereof within the amplitude. In addition, the buffer rubber (1) maintains considerable height (H1), and to enable the side member (g) to accept the impact force from a collision with said tubular member (e), the buffer rubber (1) is mounted directly to the side member (g), thereby necessitating increasing the clearance (C3) between the top surface of the tubular member (e) and the bottom of the side member (g).

(4) To assure widthwise centered round portion (d) of rear axle case (R) is maintained free from collision with some obstacle on the ground, it is necessary to maintain clearance (C4) between the underneath of the round portion (d) and the ground surface.

(5) Wheel radius (R1) affects the above-ground hight of the rear driving axle shafts and other attachments of the RWD system. So far, various proposals have been raised with these above-remarked factors taken into account, to lessen the deck floor height.

Unlike the conventional side members which used to be formed with a cetain height kept uniform above ground, to lessen the floor level of a cab and other parts of a vehicle, a pair of side members (g) shown in FIGS. 5 and 6 curve upward in the neighborhood of the rear axle case (R) as if to cross over it with specified clearances and heights secured for those portions which incur the various restrictive factors. However, such a proposal as quoted above came forth, specifing the above-ground height of rear axle case (R) vicinity which is approximately the same as compared with the conventional type frames, and thus failing to lower the level of floor (k) located over rear axle case (R) to that of other parts. Following this proposal, it is unfeasible to effectively lessen the floor level of a motor vehicle.

By decreasing the apparent height of buffer rubber (1) with the buffer rubber (1) secured, in a parallel relationship with a bracket outside side member (g) biased inward slightly in the width-wise direction and which is shown in FIG. 4, to the underneath of the bracket, it becomes possible to lower the level of floor (k) to some extent. However, this means does not make much difference, with floor (k) held over side member (g) while a specified clearance is maintained beyond a certain range within which said side member (g) keeps clear of the floor (k). The extent which this means allows lowering floor (k), is not more than the height of the buffer rubber (1). With this taken into considered, such means is not regarded to be substantially effective.

Meanwhile, another means has in the past been attempted to lower the above-ground height of the deck body (b) by shifting down the range, through which the side member keeps clear of a deck floor, with the radius of rear wheel (f) reduced as shown in FIG. 2. This other means gives rise to the problem that there occurs some loss of tractive force, and reduction in brake capacity. To compensate for this problem, it is conceivable that radius-reduced rear wheels could be employed into service, using a double wheel design. Such compensation creates a problem in that wheel change is made difficult within the limited wheel room, especially with the double-wheel system having two wheels kept in use while locked to a hub. Another problem arises with this compensation in that a motor vehicle must carry two spare wheels of two different radii, therefore, the vehicle must provide for additional spare wheel space, resulting in an increase in vehicle weight or causing some inconvenience.

It is also conceivable that the level of the floor is lowered with the rear axle case and other attachments which come with the RWD system, by introducing a front wheel drive system (hereinafter referred to as the FWD system). As compared with the RWD system, the FWD system is inferior in its capacity to produce tractive force. The attempt to make up for insufficient tractive force with greater load applied to the front wheels will increase imbalance between the front and rear wheels the load distribution when the vehicle is duly loaded, unlike the case where the vehicle is not loaded. Remarkable reduction in brake performance will result, requiring an auxiliary brake system for the security of safety. In view of the above, the FWD system proves to be unfit for commercial vehicles.

SUMMARY OF THE INVENTION

The present invention takes the various problems into full account, aiming to provide the motor vehicles, each with a lower, wider and flat floor on which to mount a luggage room or a deck body.

The object referred to above of this invention is achieved by introducing the frame which is fabricated with inter-member gap of the frame members narrowed in the vicinity of the rear driving axle system and fabricated approximately flat over the range extending from the fore to rear of said rear driving axle system.

DESCRIPTION OF THE PREFERRED EMBODIMENTS

Referring to the attached drawings, the preferred embodiments of the present invention are described herein.

Figure 7:
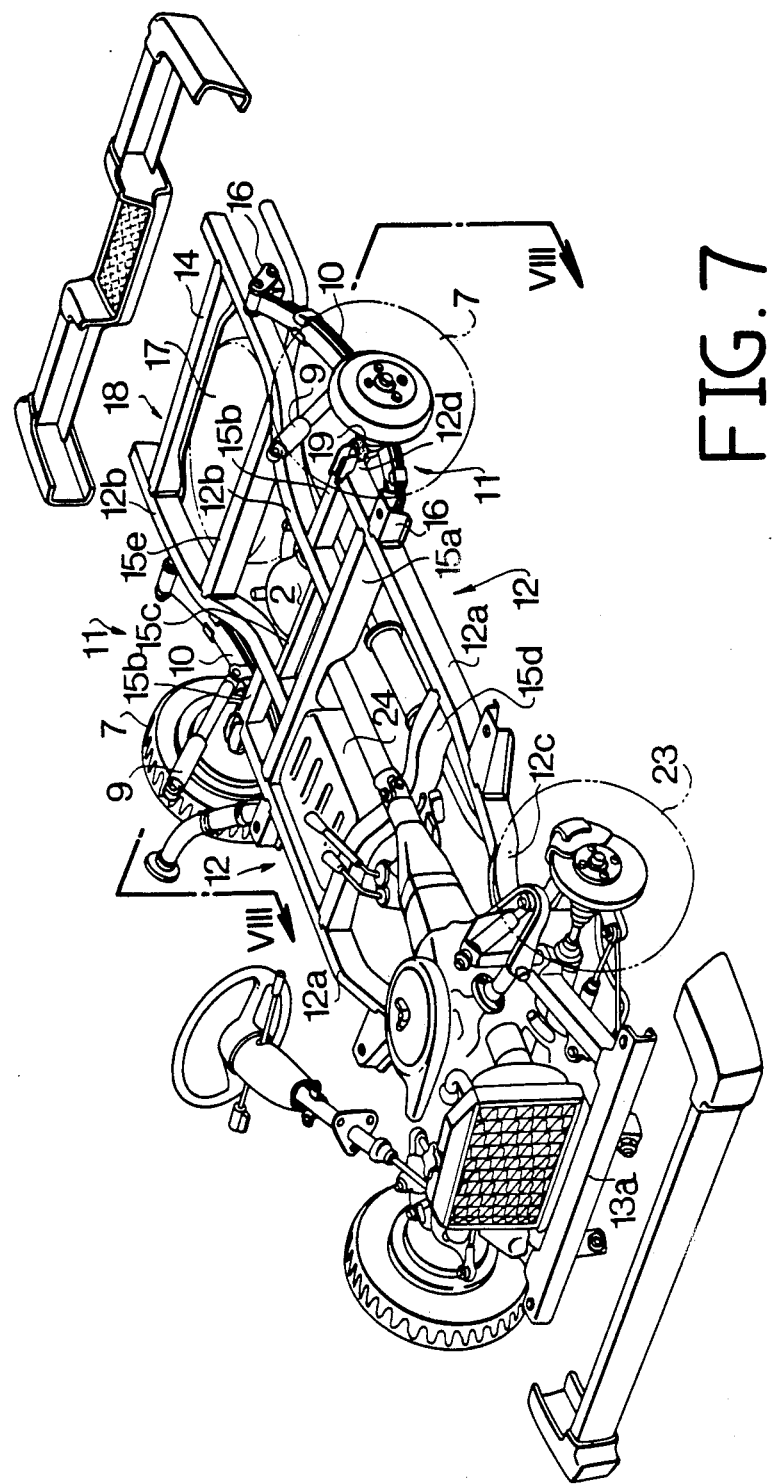
FIG. 7 is a perspective view of the motor vehicle with one preferred embodiment of the present invention.

FIG. 7 is the chassis of a motor vehicle with which the present invention is concerned.

Figure 8:
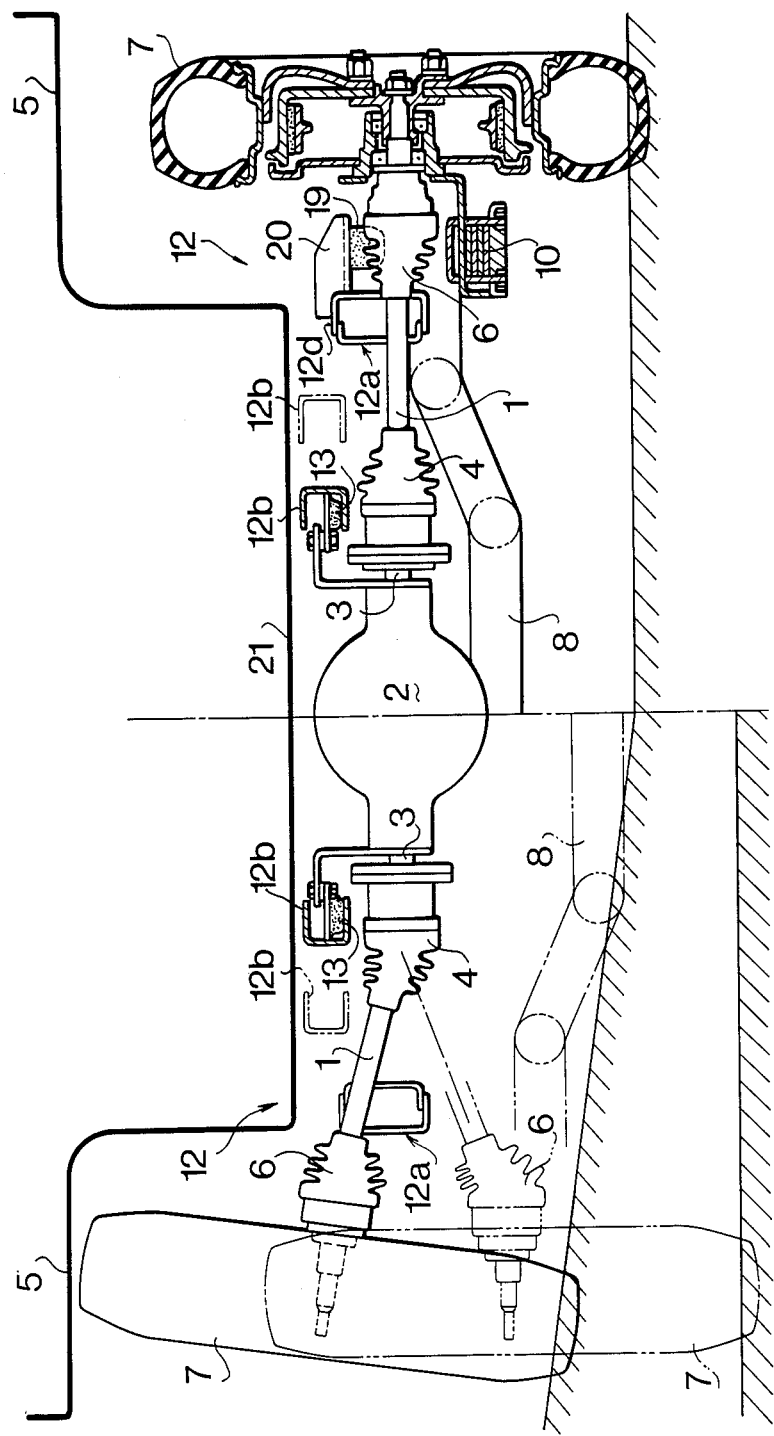
FIG. 8 is an VIII—VIII segmental view of the rear driving axle system portion in FIG. 7.

Shown in this preferred embodiment of the present invention is the chassis of a front engine, RWD design. With reference to FIG. 8, a description is given of a pair of rear driving axle shafts (1) and their vicinities. Final reduction differential (2) comprises reduction gears and differential. Said final reduction (2) is clamped to each side member (12), a component of the frame (generally via an insulator or a resilient supporting member (13) such as rubber) as described later hereinbelow. Side gear shafts (3), a pair of output shafts supported within final reduction differential (2) and which extend outward in the widthwise direction, have one of their ends coupled with the differential side gears, with the other ends being joined each to the inner end of one driving axle shaft (1) of the two in one pair by way of uniform-speed joint (4), one universal joint out of the two in one pair. Each of these driving axle shafts (1) extends outward in the widthwise direction up to the wheel room (arch-profiled portion for a rear wheel), the outer end of each driving axle shaft being connected to one rear wheel, on each side, out of the two in one pair via uniform-speed joint (6), one universal joint out of the two in one pair, whereby vertical movements which rear wheels (7) make during travelling, are absorbed respectively by uniform-speed joints (4) and (6), with driving axle shaft (1) left oscillating. The result is that said final reduction differential (2) is maintained at a given position, regardless of vertical oscillations of rear wheel (7).

The rear driving axle system described here mainly comprises said final reduction differential (2) connected to each side gear shaft (3) out of the two in one pair which commonly extend outward in the widthwise direction, a pair of driving axle shafts (1) coupled to a pair of side gear shafts (3), and a pair of uniform-speed joints (4), as well as another pair of uniform-speed joints (6), one uniform-speed joint (4) and another uniform-speed joint (6) being provided at the respective ends of each driving axle shaft (1). Beam (8) (De Dion axle) interconnects the hubs of rear wheels (7) on the respective sides.

Via suspension mechanism (11) comprising leaf spring (10) and other attachments, the load of the frame including side members (12), body load, and so forth which are otherwise called on-spring loads, are applied to beams (8). In this embodiment of the present invention, each leaf spring (10) is fixedly mounted under each driving axle shaft and low above the ground. Mechanism (9) given in FIG. 7 represents a shock absorber.

Figure 9:
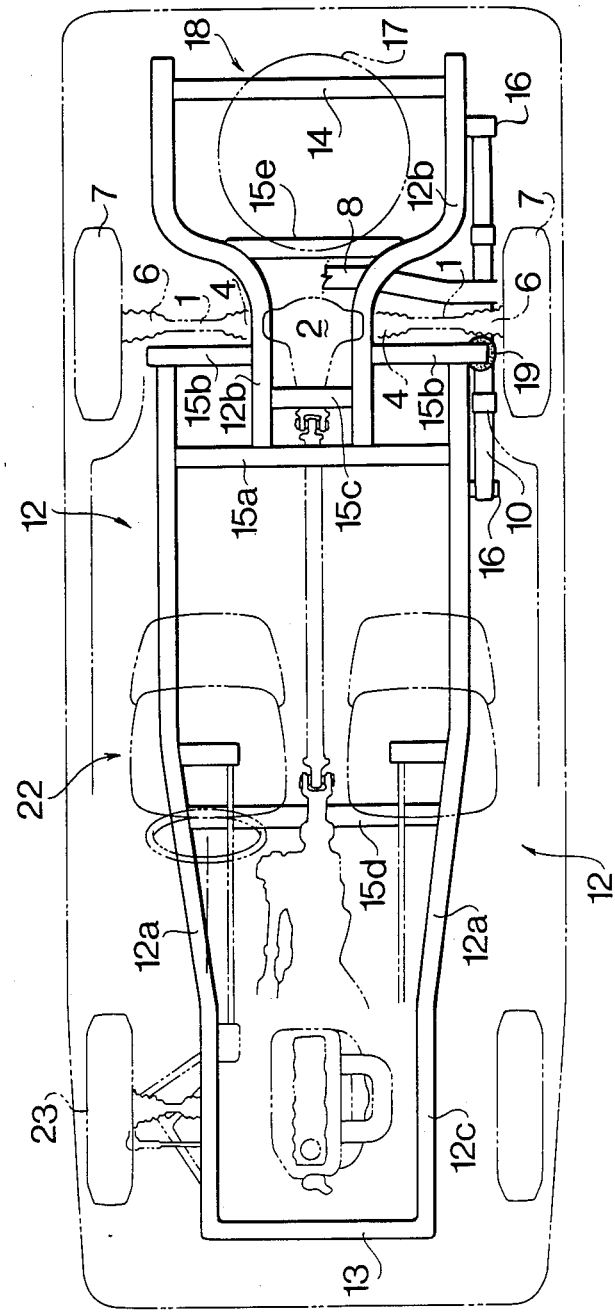
FIG. 9 is a plan view showing the newly devised frame with which the present invention is concerned.
Figure 10:
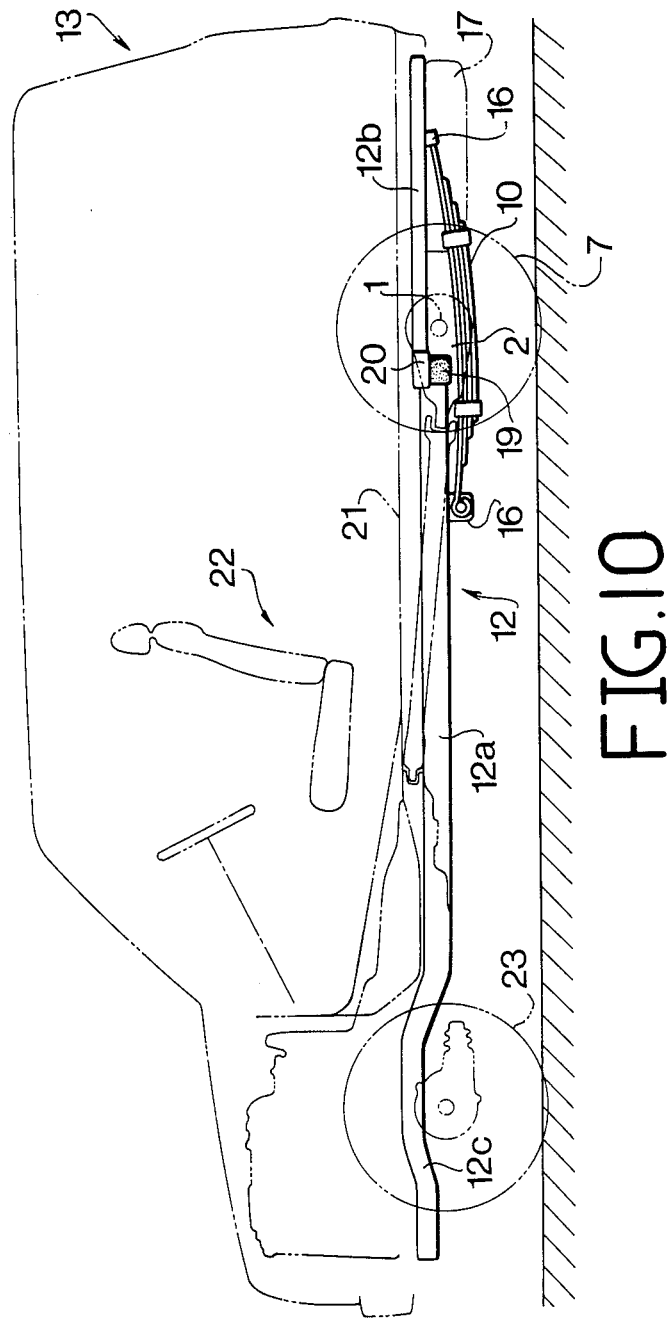
FIG. 10 is a side view of the said frame.

A pair of side members (12) (main frames) making up the frame extend, in quasi-parallel relationship with each other on both sides in the widthwise direction of the vehicle, from the front to the rear of the body as shown in FIGS. 7, 9, and 10. To be noted, particularly in this embodiment of the present invention is the structural feature of side members (12), a pair of side members (12) being of a bi-segmental construction comprising a pair of front members (12a) which run from the front to adjacent to the rear driving axle system (rear driving axle shafts (1)) with a relatively wide widthwise gap kept between the two side members, and a pair of rear members (12b) with a narrower inter-member gap compared with said front members (see FIGS. 7 through 9).

Said front members (12a) are linked together with cross member (13a) while said rear members (12b) are joined together with cross member (14) at their rear end portion. In this embodiment of the present invention, the front portions of a pair of said rear members (12b) extend forward, running past the rear driving axle system and toward the front of said system and where said front portions lie in a lengthwise overlapping relationship with the rear portion of a pair of said front members, with the rear end portion of said front members kept widthwise apart from the front end portion of said rear members. The fore ends of a pair of said rear members (12b) which extend forward, running past the rear driving axle system and toward the area fore to said system, link up with cross member (15a) (a reinforcement) extending across said fore ends and outward in the widthwise direction to inter-connect the rear end portion of said front members (12a), which are held widthwise in overlapping relationship with the front portion of said rear members. Another pair of cross members (15b), each extending a relatively short distance in the widthwise direction, link together the rear end of a pair of said front members and the front end portion of a pair of said rear members, with each cross member applied between rear end (12d) of each member (12a) and the front end portion of each rear member which is held in an overlapping relationship with the rear end portion of said each front member (12a), whereby the frame has its front and rear members being joined together, the respective inter-joining portions of said front and rear members (12a) and (12b) which are held in an overlapping relationship with each other assembled into a parallel cross structure, including said cross members, being of high mechanical strength. Further, cross member (15c) is provided widthwise between said rear members (12b) and at a position lengthwise between cross members (15a) and (15b).

As is clear from the figure, cross members (15b) are located within the area in front of driving axle shaft (1). Final reduction differential (2) is situated crosswise approximately midway within the span between the front end portions of said respective rear members (12b) and is fixedly supported with each rear member (12b) and some other frame members thereabout such as cross members (15a), (15b), (15c), and so forth, using proper means. This fixed supporting is done, generally using resilient supporting means (13) such as a rubber piece or the like.

A pair of said front members (12a) keeps cross member (15d) at an adequate point midway in their lengthwise direction, and another pair of said rear members (12b) has cross member (15e) likewise secured as above. Further, in this preferred embodiment of the present invention, a pair of said rear members (12b) are so fabricated that their inter-member gap increases backward in the area posterior to the rear driving axle system (final reduction differential), starting from the narrow gap portion thereof, up to the extent enough to provide spare tire housing space (18) where to hold spare tire (17). In this preferred embodiment of the present invention, a pair of said front members (12a) are fabricated with their front inter-member gap set relatively narrow and back inter-member gap relatively wide. Each front member (12a) has its front portions (12c) raised, slightly increasing the above-ground height thereof. Excepting said portion, the entirety of each side member (12) which comprises front and rear members (12a) and (12b), is disposed low approximately at the same above-ground level. As shown in FIG. 8, said narrow gap portion of a pair of rear members (12b) is formed, in a manner such that there will be no interference with the rear driving axle system when the driving axle shafts oscillate, such as above each uniform-speed joint (4) on the side of final reduction differential (2) with each front portion of said rear member (12b) crossing over said uniform-speed joint (4). Each rearmost end (12d) of a pair of front members (12a) maintains a wide inter-member gap and has a linkage with each front portion of rear member (12b) in the area in front of the driving axle shaft (1), using cross member (15b), whereby said narrow gap portion of a pair of side members (12) is allowed to be positioned above the rear driving axle system including driving axle shafts (1), with enough space provided to prevent each driving axle shaft from interferring with its counterpart side member when said shaft sways upward.

In the manner described above, side members (12) can be disposed as low as possible with an approximately uniform above-ground height maintained over the front and rear areas of the rear driving axle system, including the vicinity of driving axle shafts (1).

Both ends of leaf spring (10) are joined to the respective brackets, one being provided by the outer lateral side of the rear portion of each front member (12a), a component of side member (12) and the other provided also by the outer lateral side of each rear member (12b). Buffer rubber (19) is provided at rearmost end (12d) of front member (12a) facing leaf spring (10) thereby not only to restrict the amplitude of vertical oscillations of each leaf spring (10) but also to limit vertical movements of each driving axle shaft (1) (FIG. 8). Of particular note in this preferred embodiment of the present invention is the fact that, as shown in said figure, leaf spring (10) is held low under beam (8) while buffer rubber (19) is mounted to supporting bracket (20), adapted to overhang from the lateral side of each front member (12a), in the direction parallel to the height of said front member (12a) whereby the height of said buffer rubber (19) can be reduced, thus allowing a pair of side members (12) to be held low.

Floor (21) is then laid over said side members (12) assembled together in said manner to receive a deck body or a luggage room. Since side members (12) are laid approximately level lengthwise, said floor (21) can be fabricated continuously flat, starting from the side of driver's seat (22). Further, foor (21) is laid in close proximity to final reduction differential (2) fixed to the underside of each rear member (12b), with the vertical clearance between said floor (21) and said final reduction differential (2) greatly reduced.

Figure 1:
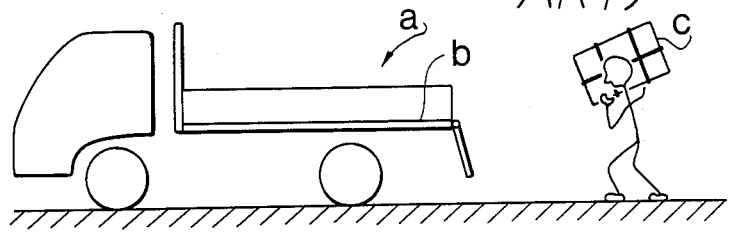
FIGS. 1 through 3 are the side-view skectches showing how the driver loads cargoes on the deck of a motor vehicle.
Figure 2:
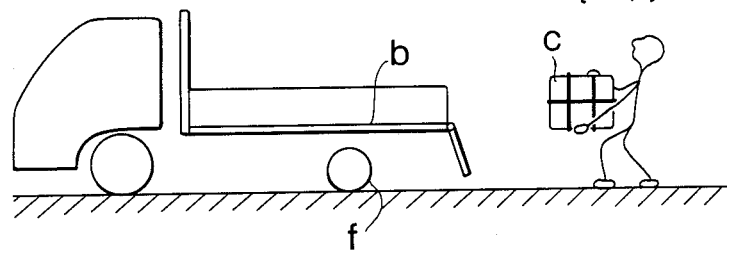
Figure 3:
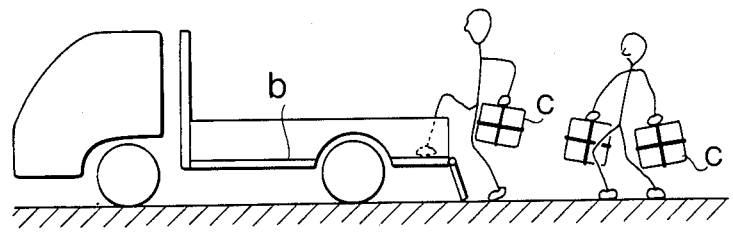
Figure 4:
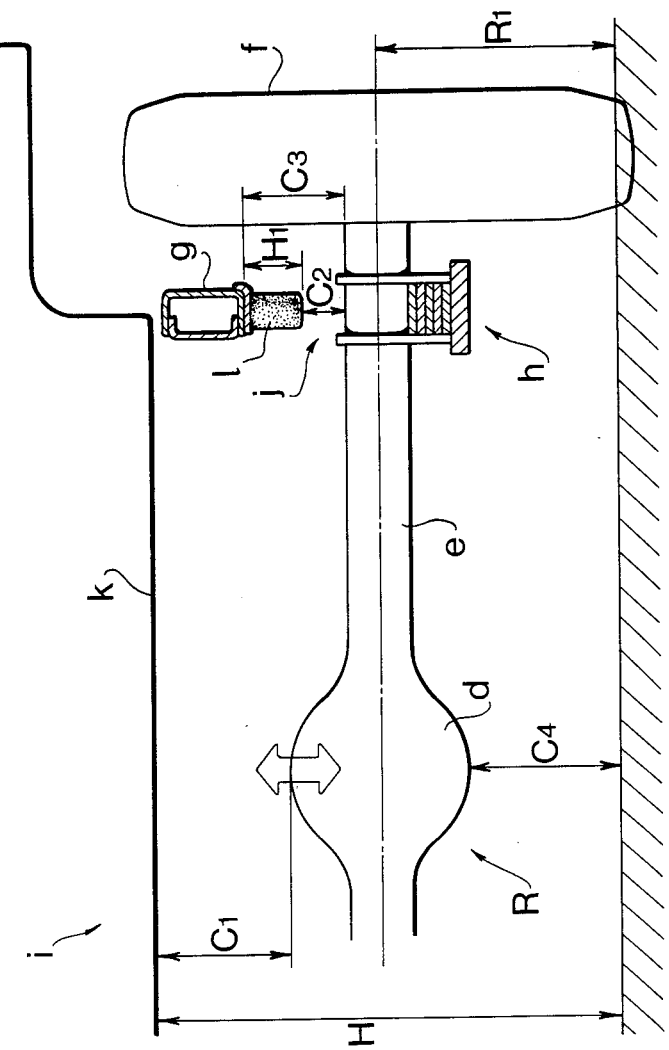
FIG. 4 is a front view showing the rear axle case of a conventional RWD vehicle and its vicinity.
Figure 5:
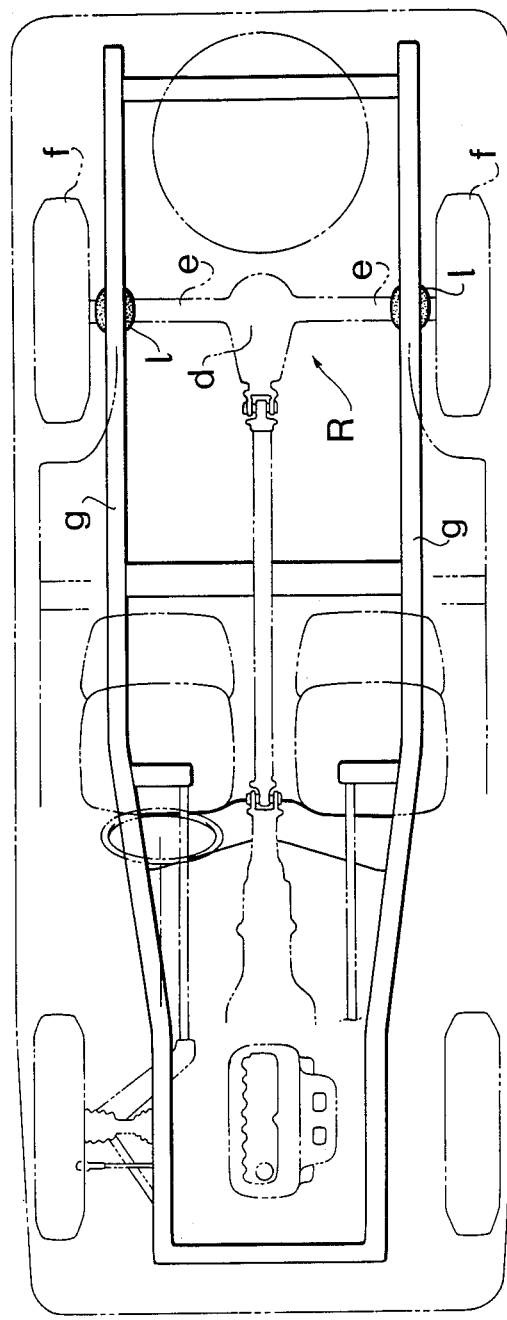
FIG. 5 is a plan view showing the conventional type frame.
Figure 6:
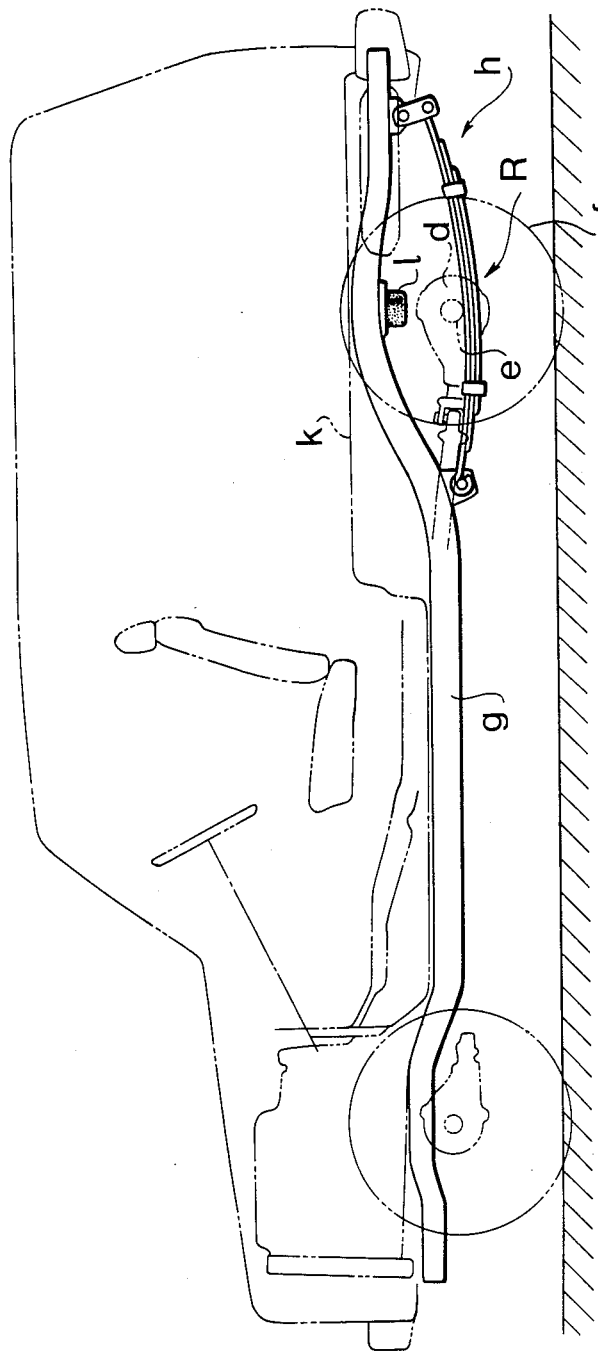
FIG. 6 is a side view of the motor vehicle.

Operation of the embodiments:

As shown in FIG. 8, during travelling, a pair of rear wheels move up and down, following the convexities and concavities in the road, and along with vertical movements of these wheels, driving axle shafts (1) sways vertically. As each uniform-speed joint (4) links each output shaft (3) of final reduction differential and each driving axle shaft together the, driving axle shaft sways, centering around each of uniform-speed joints (4) and (6). Nevertheless, floor (21) and final reduction differential (2) undergo almost no relative vertical displacement, for said final reduction differential (2) is fixed to the frame (precisely, side members (12)), and the oscillations of each driving axle shaft are absorbed respectively by uniform-speed joints (4) and (6), whereby it becomes possible to almost eliminate clearance (C1) (FIG. 4) which used to be needed between the floor and final reduction differential, allowing the above-ground height of floor (21) to be lessened remarkably.

With each side member (12) laid closely above uniform-speed joint (4) near final reduction differential and around which driving axle shaft sways, the widthwise outer portion of driving axle shaft (1) swaying over a large amplitude is prevented from interferring with said side member (12). Therefore, without being affected by the amount of limiting sways of driving axle shaft (1), a pair of said side member (12) are allowed to be disposed low, whereby the above-ground height of floor (21) can be lowered.

Floor (21) is provided with a wheel well (5), on each side thereof, which is formed to house rear wheel (7), the radius of said wheel being maintained identical with that of front wheel (23) to lessen the loss of tractive force of said rear wheel (7).

The mounting position of buffer rubber (19) is arranged between leaf spring (10) which is supported relatively low by beam (8) close to driving axle shaft (1), and side member (12). Further, with supporting bracket (20) provided, buffer rubber (19) is mounted parallel to the lateral side of said side member (12), whereby it is allowed to decrease the height of said buffer rubber with a view toward lowering the mounting height of said buffer rubber, thus making it feasible to further lessen the above-ground height of a pair of said side members (12) to receive floor (21) remarkably low.

The mechanical strength of the frame with which the present invention is concerned, is increased by widening the inter-member gap of a pair of said rear members (12b) at a back area of the frame. Further with said inter-member gap widened, spare tire housing space (18) is created between these rear members (12). In case the spare tire is suspended from rear members (12b), if said tire is held tighly in position, it is assured that no obstacles will interfere with said spare tire, whereby a pair of said side members (12) are laid low as in the foregoing, whereby floor (21) can be fabricated low, wide, and continuously flat lengthwise over the area from the side of operator's seat (22) to the rear of a deck body, for example, excepting those rear wheel wells, irrespective of the drive system being of the RWD system.

Further, the present invention does not entail (1)—changing the radius of the rear wheel (7) from that of front wheel (23), allowing the motor vehicle to go into service with one type of wheel with an identical radius, such that said vehicle will not gain additional of weight, (2)—arranging a pair of side members (12) (precisely, front members (12a)) with their inter-member gap widened will provide space therein for a fuel tank (24) and will subject the fuel system to less leakage at the time of a collision (see FIG. 7 and FIG. 11 as well, to which reference is made at a later part), and (3)—in addition to suspension mechanism (11) comprising a leaf spring and De Dion axle, which is disclosed herein, the present invention is also applicable to those suspension mechanisms of a trailing arm type, a semi-trailing arm type, etc.

Though the present invention is not applicable to an axle type suspension mechanism wherein driving axle shafts (1) are installed within the rear axle case, extending out therethrough (exceptionally applicable to De Dion, neverthless it is of the axle type). With such a drive system wherein final reducation differential (2) is fixed to the frame while the rear wheel is coupled with the driving axle shaft by way of a universal joint (uniform-speed joint, for example), said suspension mechanisms are optionally selectable.

In said embodiment of this invention, each side member (12) (precisely, rear member (12b)) is laid above uniform-speed joint (4) but it is permissible to widthwise increase the inter-member gap of a pair of said side members within the scope wherein driving axle shaft does not interfere with each side member (double-dot line denotes an assumed location where the side member is allowed to be laid with the inter-member gap increased within said scope). With the side members arranged as remarked above, the frame will have improved torsional rigidity.

Frame structural engineering as in the foregoing is an effective means to lower the floor level of those rear engine, rear drive type motor vehicles such as updated buses and similar vehicles.

Figure 11:
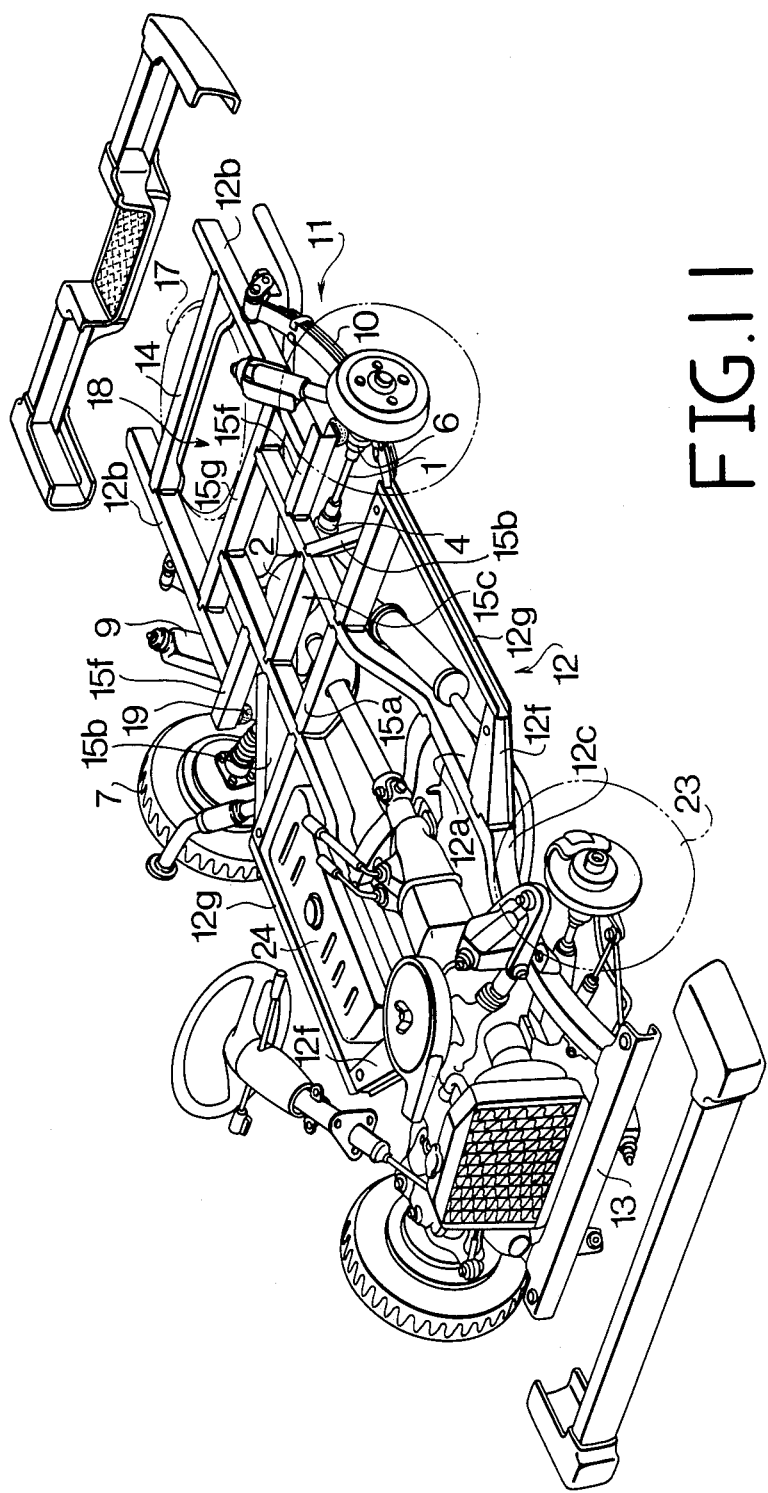
FIG. 11 is a perspective view showing a modified embodiment of the present invention.
Figure 12:
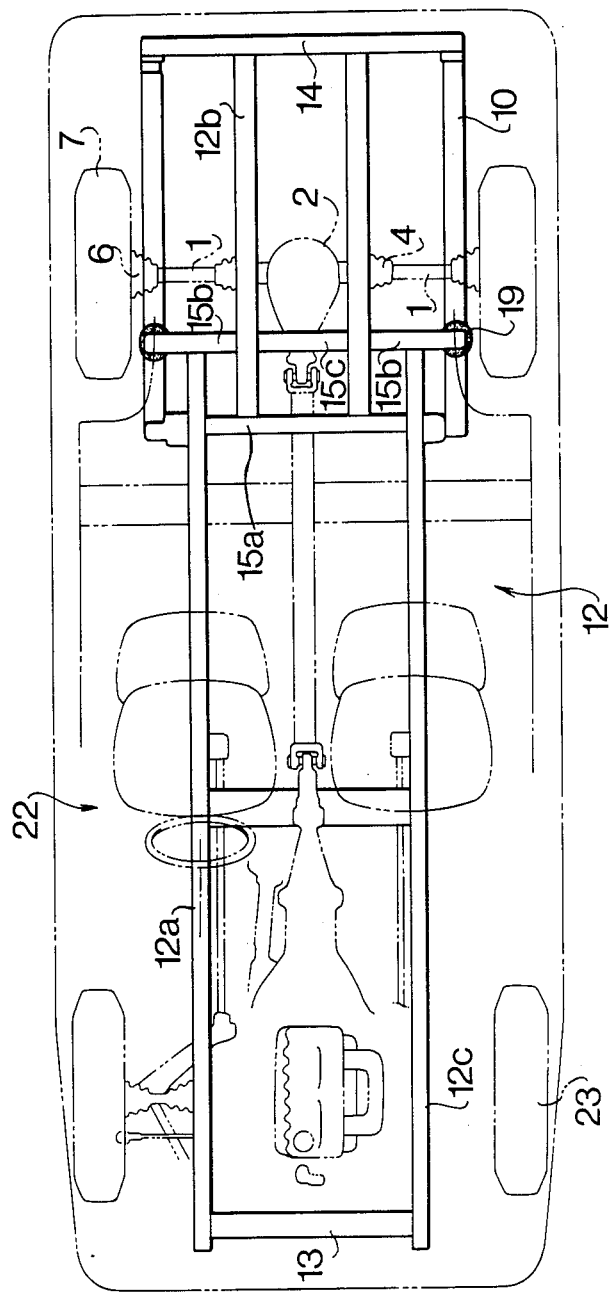
FIG. 12 is a plan view showing another modified embodiment of the present invention.

FIGS. 11 and 12 present some versions modified from the frame shown in FIG. 7 (the frame structural members and other parts indicated in these figures and which correspond to those quoted in said preferred embodiment of the present invention, are given the same numbers which have been applied originally to said those members and parts).

The chassis given in FIG. 11 features the frame construction that, unlike the frame given in FIG. 7, the inter-member gap of a pair of front members (12a) is increased in width, starting from the fore of the frame to the area forward of the rear driving axle system, but said inter-member gap is narrowed in the area where the rear driving axle system (driving axle shaft (1)) is located. From the area of said system, the side members further extend to the rear of the frame, with rear members (12b)) laid straight while their inter-member gap is increased in width again, the rear portion of a pair of said front members (2a) keeping a narrow inter-member gap and being held in overlapping relationship with the front portions of the rear members (12b), with a certain widthwise space maintained between each two of said rear and fore portions. As shown in said figure, like cross members (15a) and (15b), cross member (15g) is fixedly applied across a pair of the rear ends of front members (12a) which extends in two opposing widthwise directions, linking up with each front end portion of two rear members (12b), and a pair cross members (15f), each fixedly applied to the front end of each rear member (12b) and extending inward in the widthwise direction until it meets the rear end portion of each front member (12a), to make up parallel cross structures. Cross member (15a) extending widthwise is provided, crossing a pair of front members (12a) at a point front to the rear driving axle shaft. Reinforcement member (12g) is installed between said cross member (15a) on each side and bracket (12f) mounted to the front member (12a) at a point in the vicinity of the front wheel, running partly parallel to said front member (12a). Fuel tank (24) is mounted within the space between said reinforcement member (12g) and front member (12a).

In the case of the modified frame shown in FIG. 12, a pair of front members (12a) and each pair of rear members (12b) are straight lengthwise, unlike the front and rear members specified in FIGS. 7 through 9. Cross member (15c) and a pair of cross members (15b) are approximately aligned in a plane to link the front and rear members together, forming a frame structure as shown in said figure. The basic frame construction in this case is the same as in said preferred embodiment. In any embodiment of the present invention, final reduction differential (2) is fixed to the frame or supported with proper resilient means while final reduction differential (2) and rear wheel (7) are linked together via universal joints, using rear driving axle shaft (1). Side members (12) are laid at a certian height within the range wherein each rear driving axle shaft does not interfere with its outerpart side member when it sways vertically, the inter-member gap between a pair of side members being narrowed in the area of final reduction differential (2). With this frame applied, it becomes possible to install floor (21) low at a level within the range wherein rear driving axle shaft (1) does not interfere with the floor, said floor being continuously flat over a side area and at such a level approximately the same as with the operator's seat, similarly in said embodiment of this invention.

Figure 13:
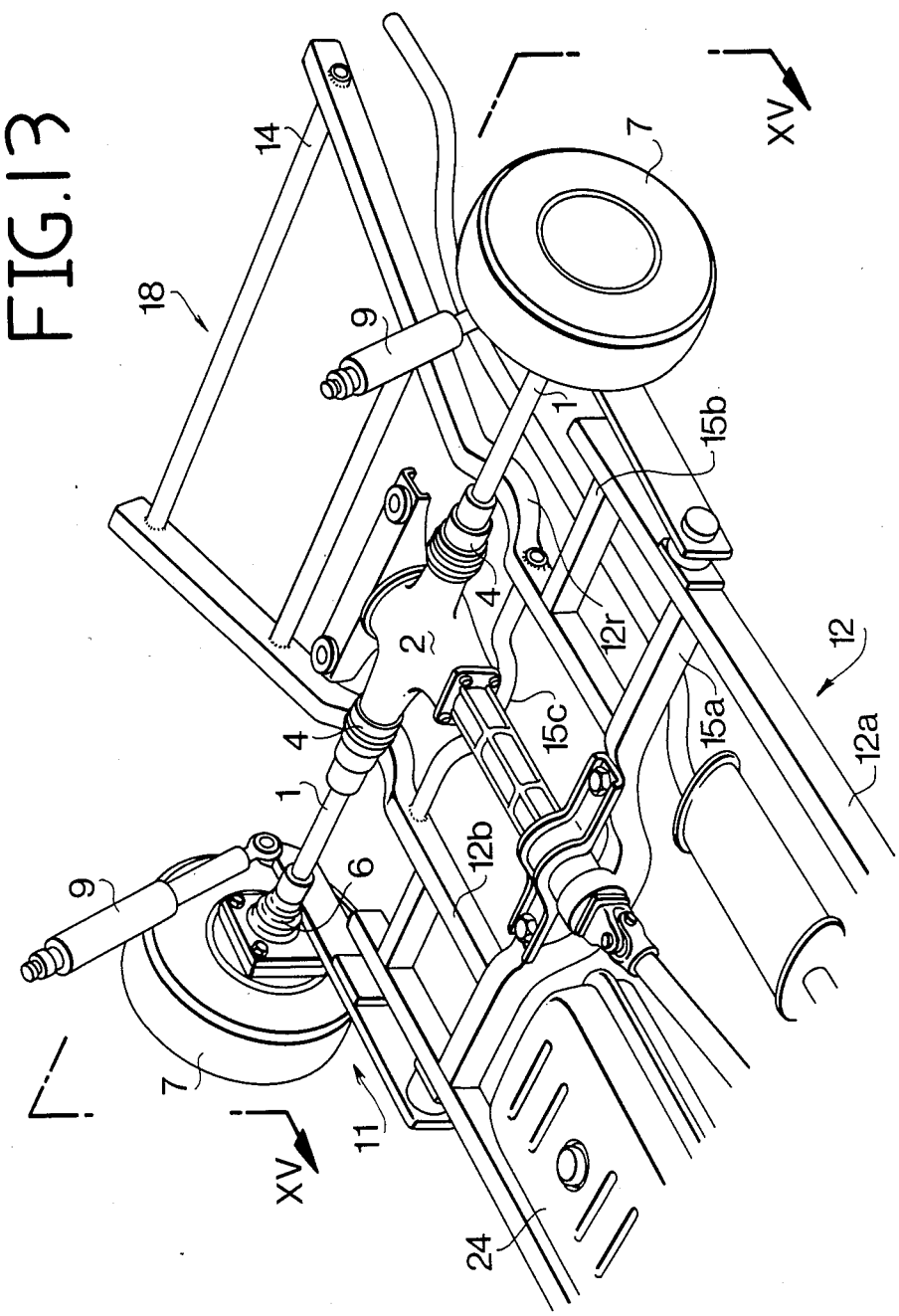
FIG. 13 is a perspective view showing the rear portion of the frame in another embodiment of the present invention.
Figure 14:
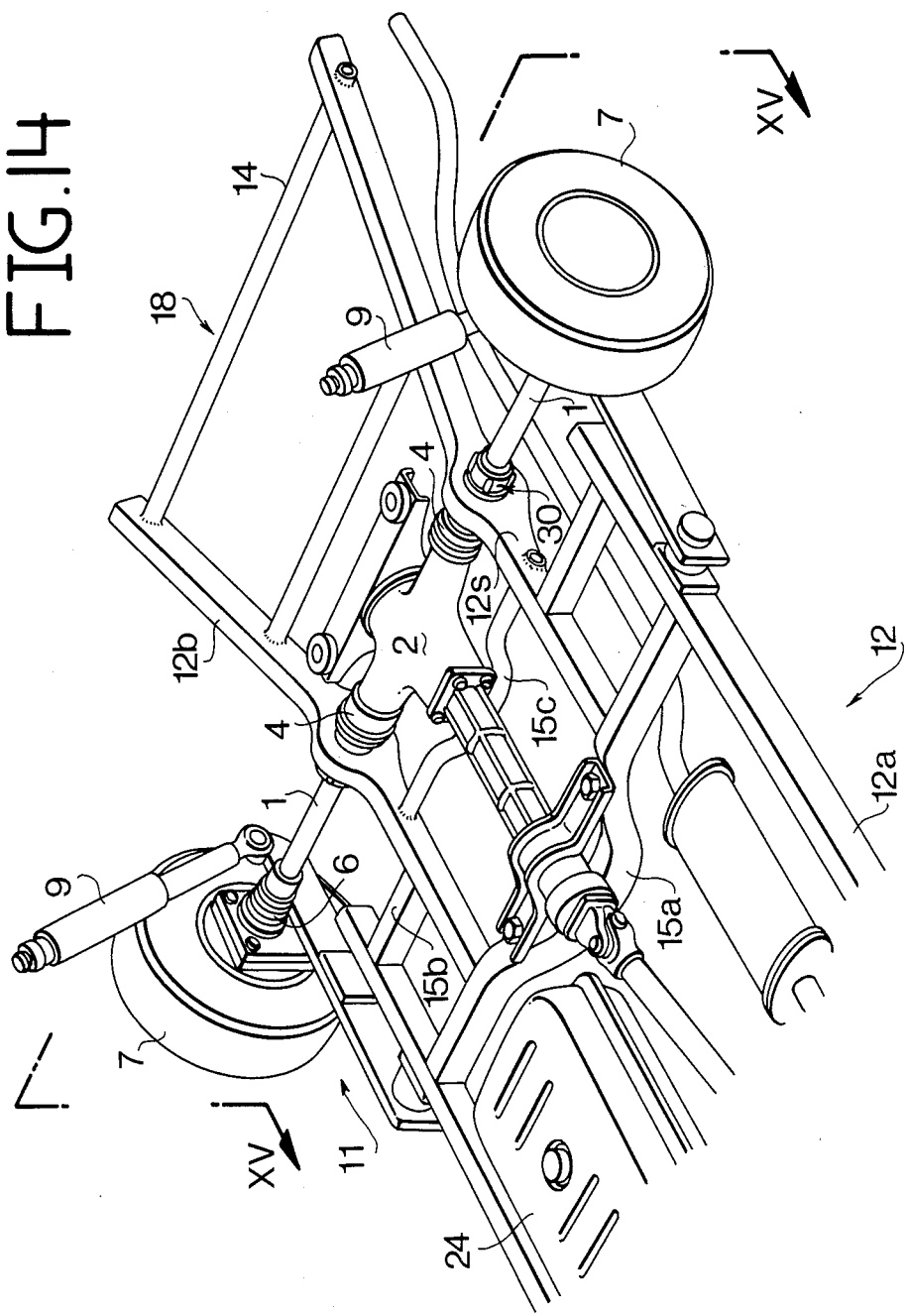
FIG. 14 is a perspective view showing the rear portion of the frame in another embodiment of the present invention.
Figure 15:
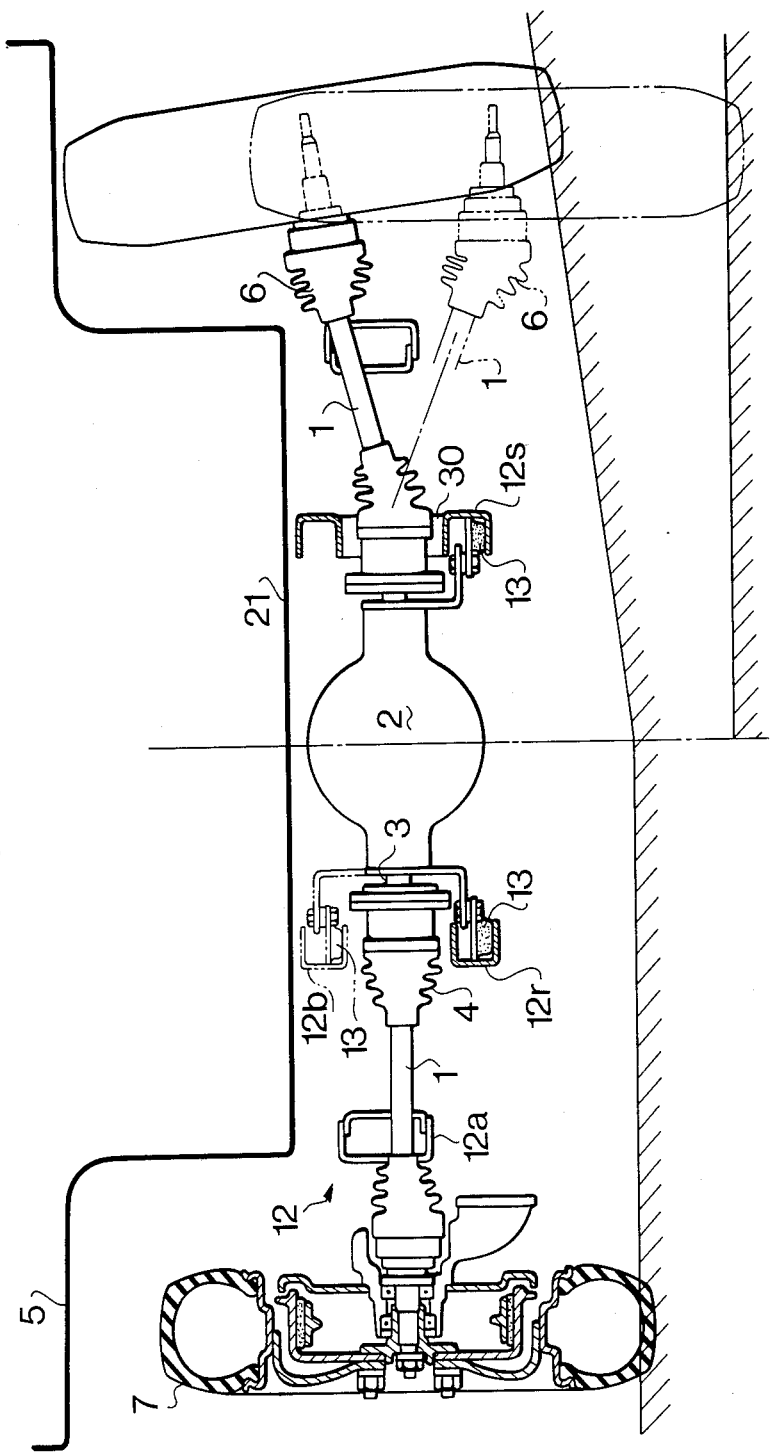
FIG. 15 is a XV—XV segmental sectional view of the rear driving axle system portions shown respectively in FIGS. 13 and 14.

Commonly, in said embodiment of the present invention which are quoted in FIGS. 7 through 12, side members (12) are laid over the rear driving axle system which links final reduction differential (2) and each wheel (7) together. If enough space is available to assure the side members freedom from interference by rear driving axle shaft (1) at the time said shaft sways vertically, it is permissible that the side members have their narrow inter-member gap portion laid under the rear driving axle system, introducing frame members (12r) (see FIGS. 13 and 15). It is also permissable that the frame is fabricated with side members (12s) of the narrow inter-member gap portion, each keeping through hole (30) whereby to mount the rear driving axle system (including uniform-speed joint (4) and rear driving axle shaft (1)) (see FIGS. 14 and 15).

Figure 16:
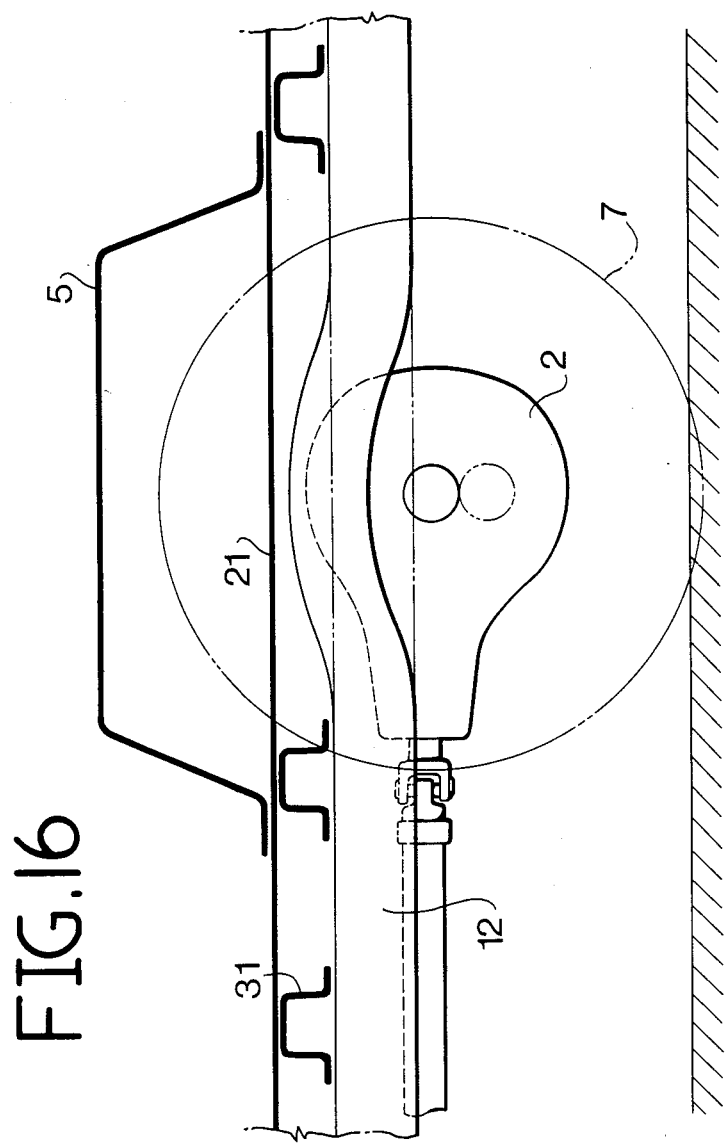
FIG. 16 is a side view of the rear part of the body and frame in another embodiment of the present invention.
Figure 17:
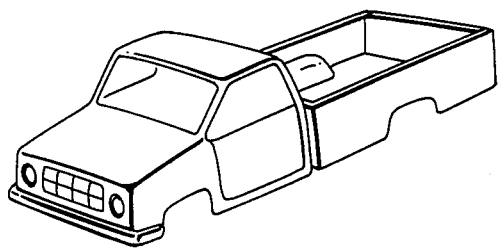
FIGS. 17 through 20 are the perspective views showing varied bodies of the motor vehicles, each with the present invention introduced.
Figure 18:
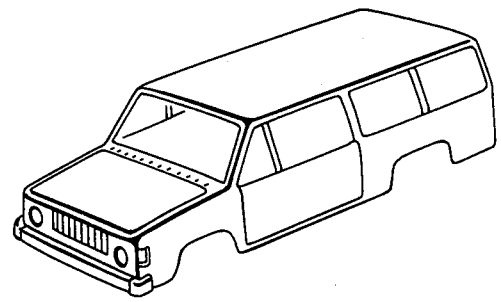
Figure 19:
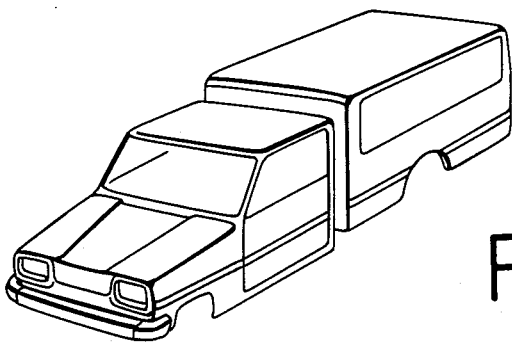
Figure 20:
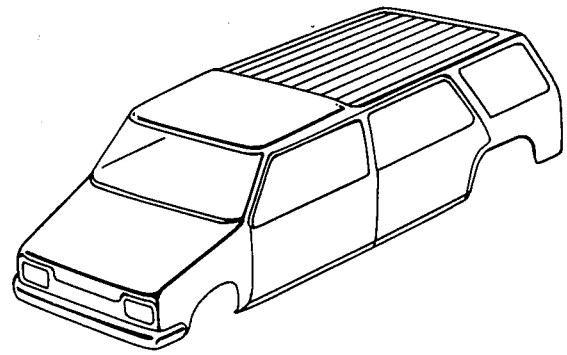

In this embodiment of the present invention, the above-ground height of the frame can be maintained approximately the same (a continuously low level in the length-wise direction) over the area extending across the front and rear of said driving axle shaft, whereby floor (21) of the deck body or the passenger room to be fabricated over the frame can be made flat, and their installation level above-ground can be lessened remarkably. Though depending on the type of motor vehicle, it is sometimes feasible to partly raise the above-ground level slightly along the lengthwise area over the rear driving axle shaft. FIG. 16 gives one example showing the case referred to above. With reference to said figure, a flat deck body behind the driver's cab is installed on the frame via bolsters (31). As is clear from the figure, floor (21) is flat but side member (12) is raised, starting respectively from the front and rear in the vicinity of the rear driving axle system, within the range wherein said side member does not contact with floor (21).

In this case final reduction differential (2) can be raised as much as the side member has been elevated. Meanwhile, the above-ground level of floor (21) can be lessened as much as said final reduction differential has been raised. Compared with the case where the side members are laid over the rear driving axle shafts with a large space secured over said shafts, likewise with the conventional frame, the offset of floor level between the area over rear driving axle shaft (1) and other area is slight, whereby it can be regarded that the floor is approximately flat. The term, "approximately flat" or "approximately uniform level" implies a slight level offset allowing the appreciation of being approximately flat.

In each of the above-cited embodiments of the present invention, the side members are divided into two parts; front and rear members which are joined together in the process of frame fabrication. But these two different members may be manufactured monolithically. This invention is applicable not only to the front engine, RWD system and rear engine, RWD system but also the 4-wheel drive system.

The present invention exemplified respectively in FIGS. 7 through 16, is applicable to the pickup, jeep style van, van-bus pickup, multi-use van, etc. shown in FIGS. 17 through 20. Though not illustrated herein, the present invention is also applicable to the small trucks with a general deck body or a flat deck body.

In conclusion, the present invention provides the following advantages:

(1) The frame can be fabricated with the inter-member gap of the side members narrowed, which are close to the rear driving axle system, also with freedom from interference by the rear driving axle shafts at the time they sway vertically, and further with a large level offset eliminated between the top surface of the rear driving axle system and the frame, whereby the above-ground height of the frame can be lowered over the area extending from the front to the rear of the rear driving axle system, regardless of the vehicle drive system is a RWD, and further, the level of the floor in the vicinity of the rear driving axle system can be lessened.

(2) The final reduction differential is fixed to the frame or held in place with resilient means while the rear driving axle shaft and output shaft of the final reduction differential are linked together to the rear whee, with unrestricted bending assured for said rear driving axle shaft, using universal joints. Further, the said rear driving axle shaft uses universal joints. Further, the side members are so devised that the frame will be allowed to be positioned above or below the rear driving axle system, the axis of which extends widthwise, or mount said rear driving axle system in the through holes in the frame, whereby the level of the floor to be laid over the frame can be lowered considerably and fabricated as flat and wide as possible.

(3) Therefore, the floor can be fabricated continuously low over the area from the front to the rear of a vehicle, as well as wide and flat.

(4) Improved efficiency of cargo loading and unloading and improved workability of the vehicle concerned will be the result.

(5) The frame is assured of rigidity with the inter-member gap of the rear members widened widthwise in the area behind the rear driving axle system. The space produced between the rear members to house a spare tire further reduces the floor level.

What is claimed is:
1. An automobile comprising:
a vehicle body;
a pair of rear driving axles;
a frame structure on which a floor is disposed, said frame structure having a pair of cross members extending transversely across the front end and rear end of said vehicle body respectively, and a pair of side members extending generally horizontally between said pair of cross members, said frame structure including a first portion forward of said rear driving axles and a second portion at said rear driving axles, said second portion being reduced in width relative to said first portion; width relative to said first portion;
a final reduction differential having a pair of outputs shafts disposed in the area of said second portion of said frame and extending transversely relative to said frame structure, said differential being mounted closely adjacent said second portion of said frame and supported by said pair of side members;
a pair of rear wheels disposed laterally outward of said second portion of said frame structure and adjacent to said rear driving axles, said rear wheel extending laterally outward respectively from said side members;
said pair of rear driving axles being respectively coupled between said pair of rear wheels and said pair of output shafts of said final reduction differential so as to connect said rear wheels with said output shafts respectively;
a first pair of universal joints respectively joining said pair of rear driving axles with said pair of output shafts;
means for aligning said first pair of universal joints with respect to said second portion of said frame such that said rear driving axles are not interfered with by said second portion upon upward movement of said rear driving axles; and
a second pair of universal joints for respectively joining said rear driving axles with said rear wheels, each of said universal joints of said second pair of universal joints being outboard of said second frame spaced axially from a respective one of said universal jonts of said first pair of universal joints.

2. An automobile according to claim 1, including a pair of suspension mechanisms respectively connected between said pair of rear wheels and said frame structure to suspend said rear wheels from said frame structure, said pair of suspension mechanisms including leaf springs respectively, the center of said leaf springs being disposed below said rear driving axles, the ends of said leaf springs being attached to said side members.

3. An automobile according to claim 1, including a pair of suspension mechanisms respectively connected between said pair of rear wheels and said frame structure to suspend said rear wheels from said frame structure, said pair of suspension mechanisms including buffer rubbers respectively and brackets respectively extending outwardly from said side members, said buffer rubbers being respectively mounted on said brackets above said leaf springs and vertically aligned with said leaf springs so as to face said leaf springs.

4. An automobile, comprising:
a vehicle body including a flat floor at the rear thereof;
a pair of transversely extending rear driving axles;
a final reduction differential having a pair of transversely extending output shafts;
a pair of rear wheels respectively laterally outboard of said rear driving axles;
a first pair of universal joints for respectively joining said rear driving axles with said pair of output shafts, said first pair of universal joints defining pivot points about which said driving axles may pivot upwardly;

means for aligning said first pair of universal joints with respect to said second portion of said frame such that said rear driving axles are not interfered with by said second portion upon upward movement of said rear driving axles;

a second pair of universal joints for respectively joining said rear driving axles with said rear wheels, each of said universal joints of said second pair of universal joints being outboard of said second frame spaced axially from a respective one of said universal joints of said first pair of universal joints; and, frame structure on which said floor is disposed, said frame structure including (1) longitudinally extending frame means including a first frame portion forwardly of the longitudinal position of said rear driving axles, and a second frame portion at the longitudinal position of said rear driving axles, said second frame portion being reduced in width relative to said first portion and being defined by a pair of transversely spaced apart side frame members lying in a substantially horizontal plane with said flat floor disposed thereover, said side frame members being generally transversely aligned with and extending over said pivot points of said driving axles whereby clearance is provided to allow upward pivotal motion of said driving axles, and said flat floor is closely spaced from said rear driving axles and said differential to minimize the vertical distance from said floor to the ground, (2) transversely extending frame means interconnecting said side frame members.

5. An automobile according to claim 4, wherein said differential is connected to and supported by said frame members.

6. An automobile according to claim 4, wherein said flat floor extends laterally outward beyond said side frame members at the longitudinal position of said rear driving axles and said differential, and overlies at least a portion of said rear driving axles.

7. An automobile according to claim 4, wherein said floor extends transversely outwardly beyond said side frame members and is essentially flat throughout the area covering said rear driving axles and said differential.

* * * * *